July 31, 1923.
W. W. MILLER
DOFFING AND DONNING MECHANISM
Filed Oct. 29, 1921 6 Sheets-Sheet 1
1,463,479
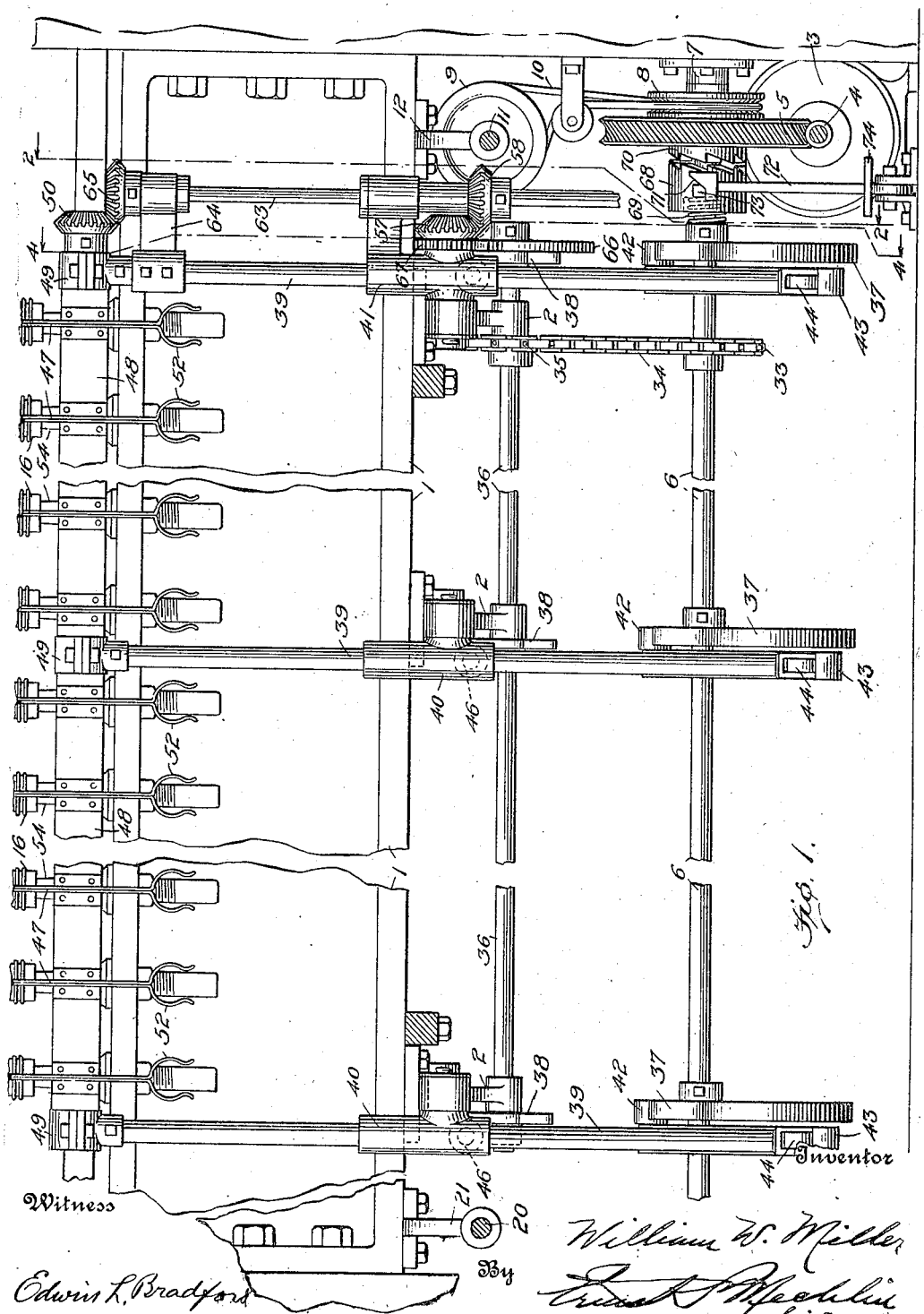

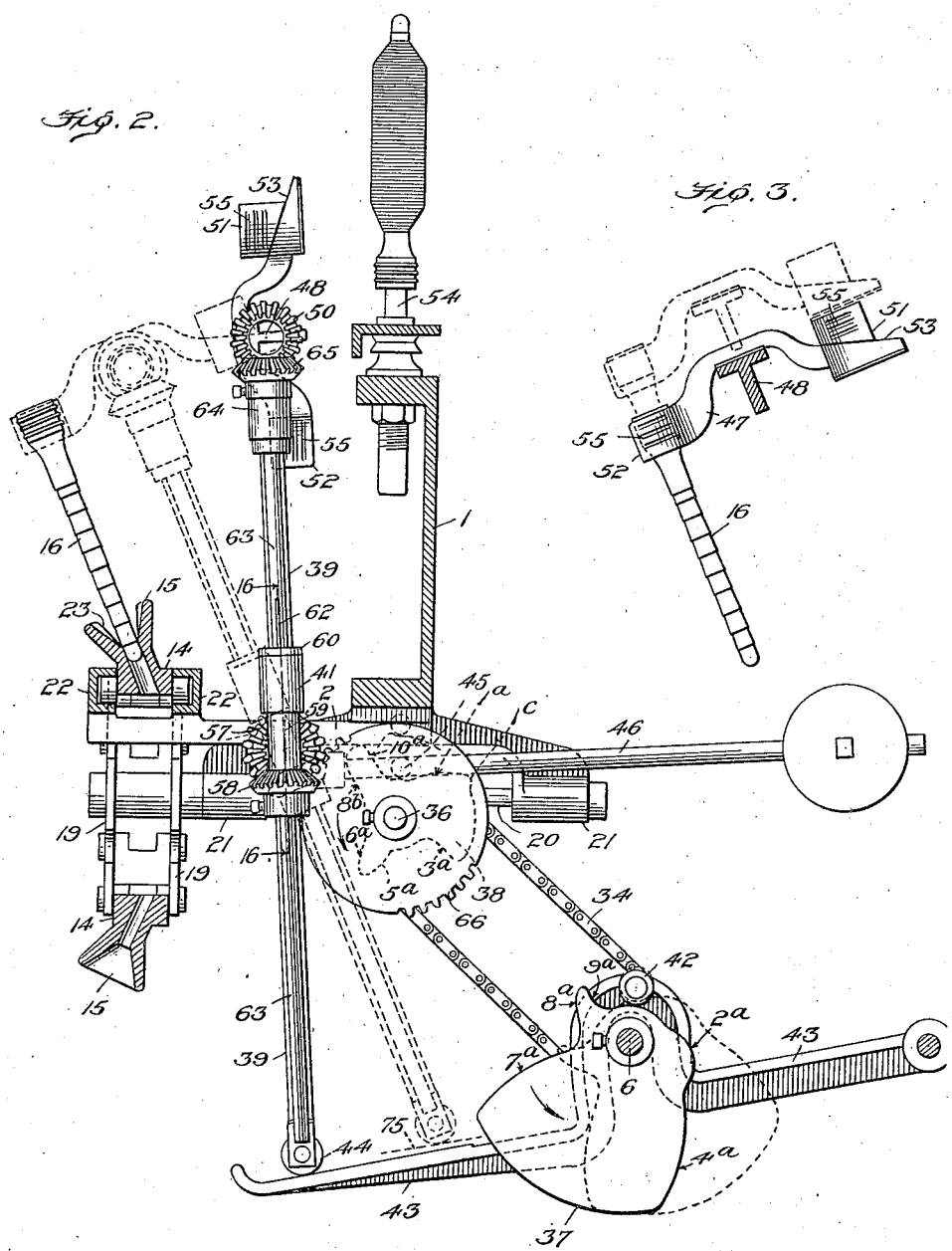

July 31, 1923.
W. W. MILLER
DOFFING AND DONNING MECHANISM
Filed Oct. 29, 1921 6 Sheets-Sheet 3
1,463,479
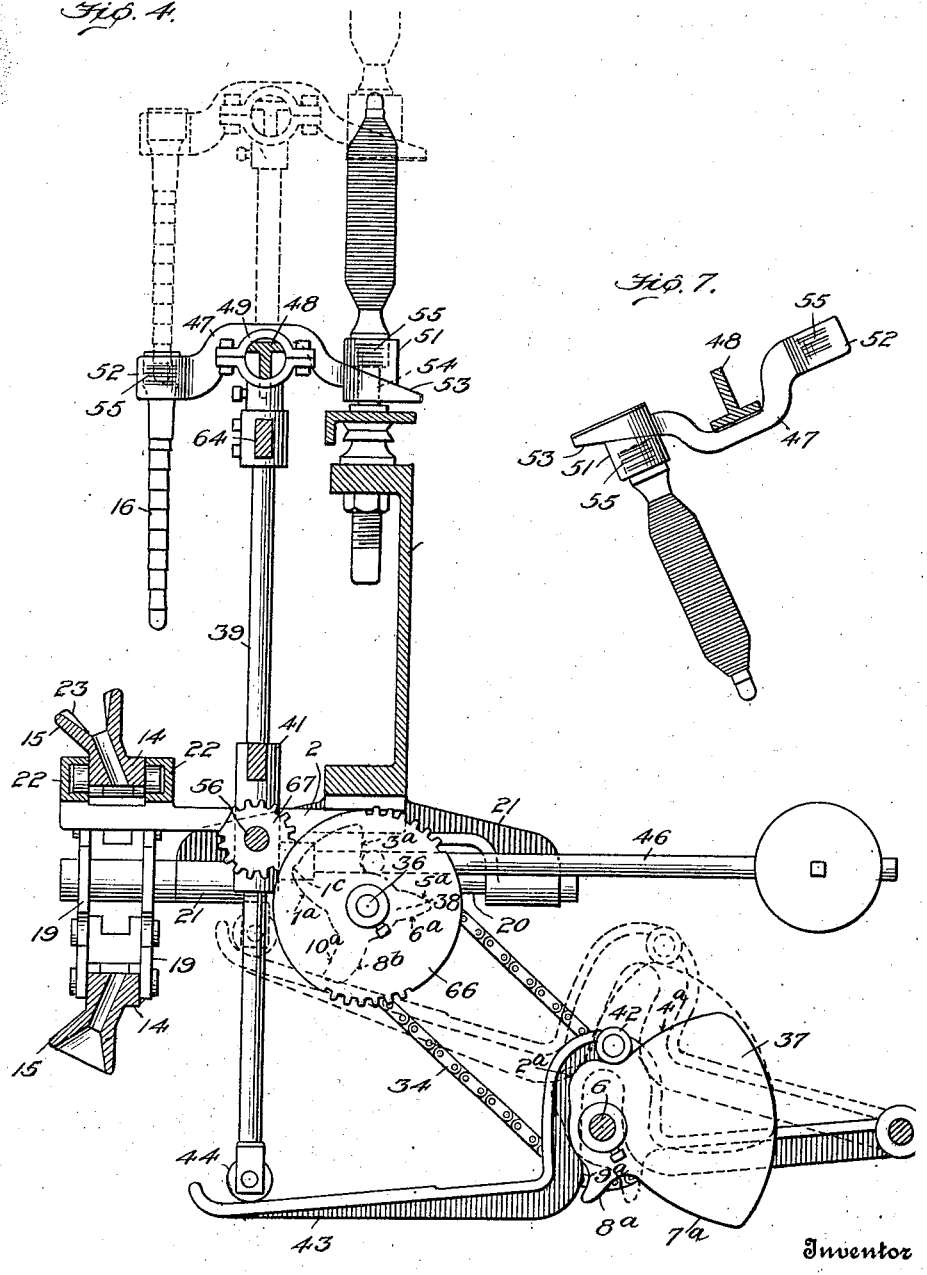

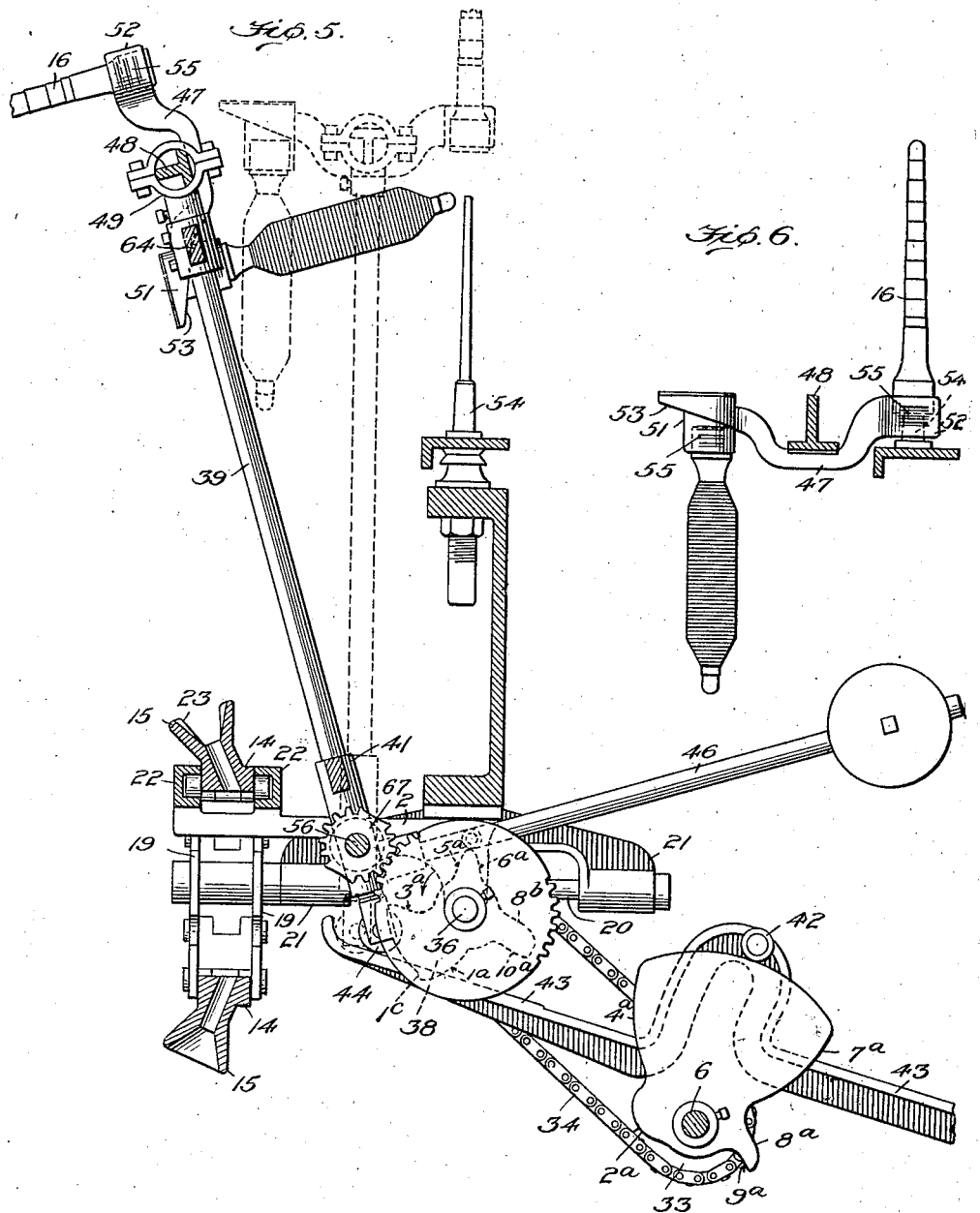

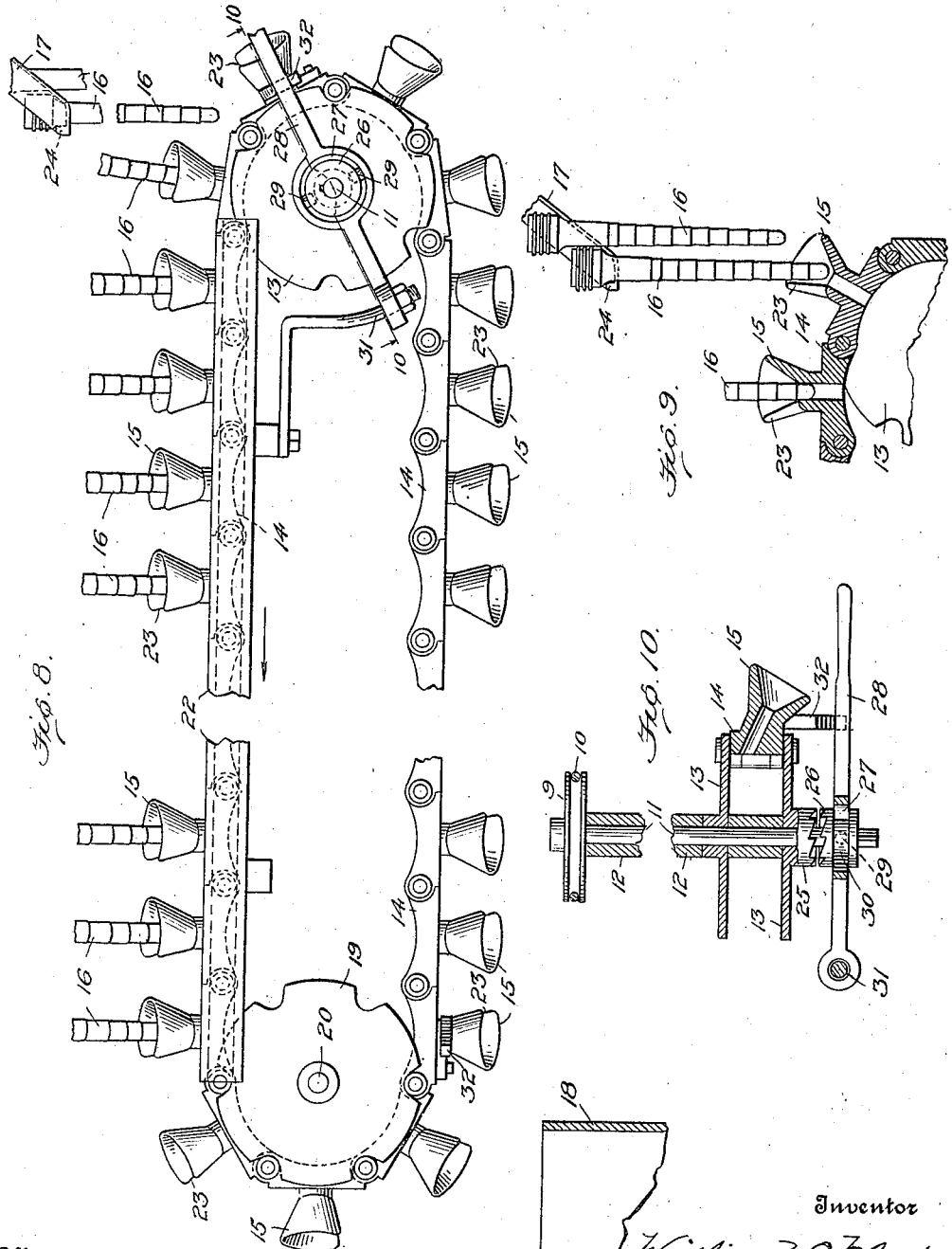

July 31, 1923.
W. W. MILLER
1,463,479
DOFFING AND DONNING MECHANISM
Filed Oct. 29, 1921   6 Sheets-Sheet 6
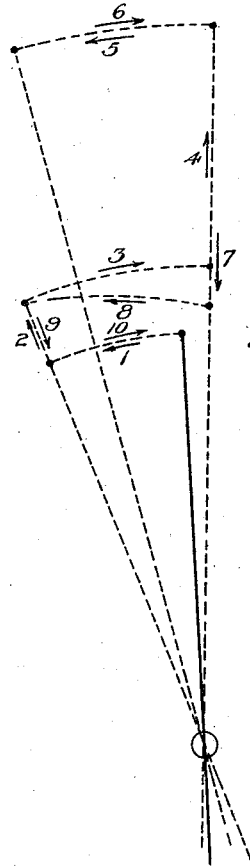
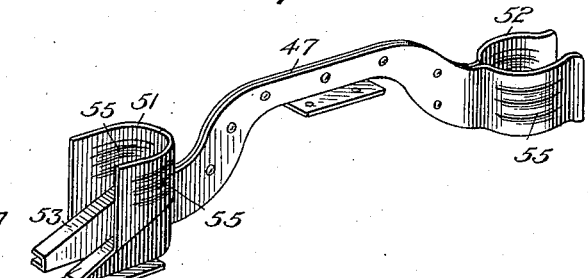
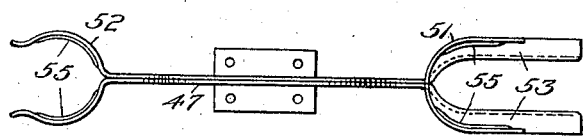
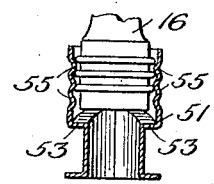 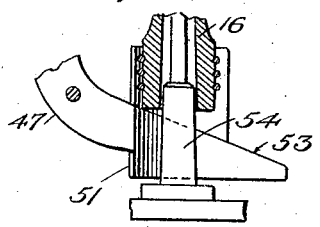
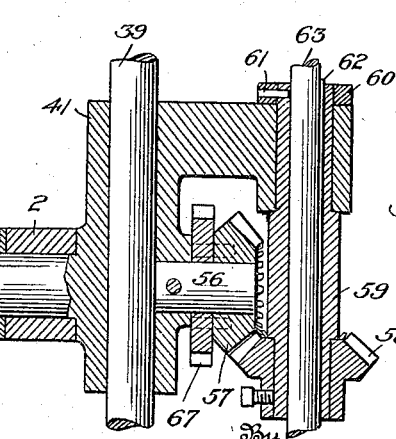
Witness
Edwin L. Bradford
Inventor
William W. Miller
By Ernest ?
His Attorney Patented July 31, 1923.

1,463,479

UNITED STATES PATENT OFFICE.

WILLIAM W. MILLER, OF MARTINSVILLE, VIRGINIA.

DOFFING AND DONNING MECHANISM.

Application filed October 29, 1921. Serial No. 511,313.

*To all whom it may concern:*

Be it known that I, WILLIAM W. MILLER, a citizen of the United States, residing at Martinsville, in the county of Henry and State of Virginia, have invented certain new and useful Improvements in Doffing and Donning Mechanism; and I do hereby declare the following to be a full, clear, and exact description of the invention, such as will enable others skilled in the art to which it appertains to make and use the same.

The invention relates to doffing and donning mechanisms for spinning machines and the like, i. e., to the mechanisms by which full bobbins are doffed from spindles of a spinning frame or the like, and empty bobbins are donned upon the said spindles. It relates more particularly to doffing and donning mechanisms of the class organized to effect collective doffing of a series of full bobbins simultaneously, and collective donning of a series of empty bobbins simultaneously. To some extent the features and sub-combinations embraced by the invention are applicable for doffing and donning bobbins individually in succession, and such application is within the scope of the invention.

The invention comprises improvements in bobbin engaging members employed for doffing purposes. It provides means for supporting empty bobbins in position for being taken and applied to the spindles of a spinning frame, also for receiving the doffed full bobbins taken from such spindles, also for conveying empty bobbins into positions adjacent the spindles to which they are to be applied, and also for conveying away the doffed full bobbins. It comprises various combinations of such means with donning devices, with doffing devices, and with combined doffing and donning devices. It includes novel actuating means for a rotary or oscillating bobbin carrier, for imparting to the latter vertical, lateral (forward and rearward), and rotary motions in such succession as shall cause the carrier to perform the required functions for doffing, or donning, or both doffing and donning.

I will proceed to describe the preferred illustrative embodiment of my invention, so that those skilled in the art to which it appertains may practice the same.

As spinning machines involve a large number of bobbin spindles, frequently as many as one hundred or more on each side of the machine, it is virtually impossible, in a limited drawing, to show my improved mechanism as a whole, nor indeed is that necessary to a full understanding of the invention; and the features of the invention may be embodied in a unit of construction and operation which may be repeated or multiplied as often as may be desired, depending on the number of spindles on the spinning machine.

In the drawings chosen for the purpose of illustrating the preferred embodiment of the various features of my invention,—

Figure 1 is a front elevation of doffing and donning mechanism illustrating my invention, together with a portion of a spinning machine with which the mechanism is employed, parts being broken away, and the bobbin conveyor, or delivery and receiving mechanism, being omitted.

Figure 2, Sheet 2, is a vertical sectional view taken on the line 2, 2, Fig. 1, showing in addition to the parts illustrated in Fig. 1 a transverse section of the bobbin delivery and receiving mechanism, the operative parts being shown in full lines in their initial position, or as shown in Fig. 1 of the drawings, and the dotted lines indicating the forward lateral or first movement of the carrier in taking an empty bobbin.

Figure 3, Sheet 2, is a detail side elevation of the bobbin carrier, one empty bobbin being shown therein and the second or ascending vertical movement of the carrier in taking up an empty bobbin being shown in dotted lines.

Figure 4, Sheet 3, is a view similar to Fig. 3, but taken on the line 4—4, Fig. 1, showing the carrier mechanism after the return or rearward lateral, or third movement, the dotted lines indicating the ascending vertical or fourth movement which doffs the full bobbin.

Figure 5, Sheet 4, is a vertical section similar to Fig. 4 but illustrating in full and in dotted lines, respectively, the fifth and sixth positions of the parts assumed upon succeeding lateral movements of the carrier, the dotted lines indicating the rotary or sixth movement of the carrier by which the empty bobbin is brought over and in line with the spindle of the spinning machine. From the position shown in dotted lines in this figure of the drawings the carrier by subsequent descending vertical movements (7 and 9) and forward and rearward lateral movements (8 and 10) deposits the full bobbin in the receptacle provided therefor, and returns to the initial position shown in Fig. 2 of the drawings.

Figure 6, Sheet 4, is a detail view, partly in section and partly in side elevation, showing a portion of the spinning machine and the carrier with a full and an empty bobbin and illustrating the relation of the parts when the descending vertical or seventh movement has taken place and the empty bobbin has been placed on the spindle of the spinning machine.

Figure 7, Sheet 3, is a side elevation of a bobbin engaging member of the carrier and a full bobbin, the said member being shown in position for discharging the full bobbin.

Figure 8, Sheet 5, is a side elevation of a traveling endless conveyor belt and its adjuncts, parts being broken away, for delivering empty bobbins to the carrier and receiving full bobbins therefrom.

Figure 9, Sheet 5, is a detail sectional view of a portion of the traveling conveyor shown in Fig. 8, together with empty bobbins and a portion of a chute for delivering the bobbins to the conveyor.

Figure 10, Sheet 5, is a detail sectional view on the line 10—10, Fig. 8, showing the mechanism for controlling the movement of the traveling conveyor.

Figure 11, Sheet 6, is a diagram illustrating the movements of the bobbin carrier.

Figure 12, Sheet 6, is a perspective view of a bobbin engaging member of the bobbin carrier.

Figure 13, Sheet 6, is a plan view of a bobbin engaging member.

Figure 14, Sheet 6, is a detail sectional view of that end of a bobbin engaging member which removes a full bobbin from a spindle of the spinning machine, showing the head of a bobbin in the grasp of the said end.

Figure 15, Sheet 6, is a detail sectional view, taken at right angles to the section of Fig. 14, of the doffing end of a bobbin engaging member.

Figure 16, Sheet 6, is a detail sectional view taken on the line 16—16, Fig. 2, showing the gearing which actuates the shaft of the bobbin carrier.

Like symbols refer to like parts wherever they occur.

In the drawings 1 indicates a portion of the frame of a spinning machine carrying the spindles for the bobbins.

The basic unit of construction which has been selected by me to illustrate my improvements involves a reversible or rotatable bobbin carrier, a vertically and laterally movable carrier support therefor, suitable gearing for imparting rotative motion to the carrier, and cams for directing and timing the motions of the movable carrier support. This unit mechanism, or any multiple thereof which may be desired, may be conveniently supported from the frame 1 of the spinning machine by brackets 2 in such number as circumstances may require.

The doffing and donning mechanism may be actuated by an electric motor 3 (lower right hand side of Fig. 1,) or other suitable source of power. As shown in the drawings, the shaft 4 of the motor is preferably formed with a worm which drives a worm wheel 5 rotatably mounted on a shaft 6 journaled on the machine frame in suitable bearings, one of which is shown at 7 at the right hand side of Fig. 1. Secured to the worm wheel 5 is a belt pulley 8 which is connected to a belt pulley 9 by means of a belt 10. The pulley 9 is suitably attached to a shaft 11, Figs. 1 and 8, which is journaled in a bearing bracket 12, Fig. 1, carried by the frame 1.

Loosely mounted on the shaft 11 is a sprocket wheel 13, Figs. 8, 9 and 10, for driving the traveling conveyor comprising the chain belt 14 carrying the series of funnel shaped or bell mouthed receptacles 15 which are preferably employed not only for receiving the empty bobbins 16 from a slotted chute 17, Figs. 7 and 8, and delivering them to bobbin-engaging elements of the bobbin carrier, but also for receiving the full bobbins from doffing elements of the carrier and discharging them into a suitable receptacle 18. At the opposite end from the driving sprocket wheel 13 the chain belt 14 passes around a sprocket wheel 19, Figs. 2, 4, 5 and 8, which is mounted on a shaft 20 journaled in a bracket 21 similar to the bracket 12. The upper horizontal run of the traveling chain belt is preferably supported against sagging by channeled guides 22 mounted on the frame 1 and through which said belt runs.

The leading side of each of the bell mouthed receptacles 15 is open or slotted, as at 23, Figs. 2, 4, 5, 8 and 9, to permit the entry of the lower ends of the empty bobbins 16 as the latter successively are supplied from the chute 17. The lower end of said chute is formed with lips or lugs 24 which prevent the bobbins from escaping from the chute until they are withdrawn therefrom by the passage of the receptacles 15, as will readily be understood upon reference to Fig. 9. The axes of the said receptacles are preferably inclined transversely to the line of travel of the belt 14 (see Fig. 10) and their inner walls are also inclined to the line of motion of the belt so as to avoid binding the bobbins at the time of their receipt when empty or at the time of their delivery when full.

The chain belt 14 is only driven as occasion may require. To connect its driving sprocket 13 to the rotating shaft 11 it is preferred to employ the following mechanism: The sprocket wheel 13 carries on its outer face a clutch member 25, Fig. 10, which is adapted to cooperate with a mating clutch member 26 that is splined to the shaft 11 so as to be movable longitudinally thereon. The slidable clutch member 26 is rotatable in a suitable orifice 27 formed in a clutch actuating lever 28, Figs. 8 and 10, which is operatively connected to said clutch member 26 by means of pins or lugs 29 that are secured to said lever and project into a groove 30 formed in the periphery of the member 26. The lever 28 is slidably and pivotally mounted on a bracket 31 carried by the spinning frame 1, a portion of said bracket being curved to enable the lever 28 to be rotated on the clutch member 26 sufficiently to clear the inclined lugs 32 with which the belt 14 is provided at appropriate intervals to constitute means for automatically disengaging the clutch members 25 and 26 so as to limit the travel of the belt 14. To cause the sprocket wheel 13 to be clutched to the rotating shaft 11 the free end of the lever 28 is manually pulled forward far enough to clear the adjacent inclined lug 32 and the lever is then rotated around the clutch member 26 and shaft 11 until it clears said lug, whereupon the lever may be moved rearward so as to force the clutch member 26 (splined to the shaft 11 as aforesaid) into driving engagement with the clutch member 25 secured to the sprocket wheel 13. As soon as the continued travel of the chain belt 14 brings the next inclined lug 32 into engagement with the lever 28 the latter is forced outward thus withdrawing the clutch member 26 from operative engagement with the mating clutch member 25 and thereby stopping further travel of the belt. While I have described and illustrated but two lug members 32 it will of course be apparent that the number and position of such lugs may be suited to any desired extent of movement of the belt or bobbin supplying mechanism. This movement may be equal to the length of the series of spindles in the spinning frame, or may be equal to a fractional part of such length in case two or more conveyors are employed.

The mechanism now to be described for transferring the full bobbins from the spindles of the spinning frame to the bell mouth receptacles 15 carried by the traveling belt, and for transferring empty bobbins from said receptacles to their positions on the spindles from which the full bobbins have been withdrawn is designed in the embodiment of the invention herein illustrated, to complete the cycle of operations during a single rotation of the shaft 6.

Mounted on the shaft 6 is a sprocket wheel 33, Figs. 1 and 5 which, through the medium of a chain belt 34 and sprocket wheel 35, drives a shaft 36 that is journaled in the brackets 2. The shafts 6 and 36 revolve in equal times. The shaft 6 is provided with one or more cams 37, Figs. 1, 2, 4 and 5, and the shaft 36 has one or more cams 38 secured to it. The cams 37 and 38, which will hereinafter be more fully described, impart to the supporting shafts or columns 39 at the upper ends of which the bobbin carrier is mounted, the vertical and lateral movements necessary to be imparted to the bobbin carrier in order to enable it to doff and don the bobbin.

Each of the supporting shafts or columns 39 is slidably mounted in a sleeve 40 or 41 which is itself pivotally mounted on a corresponding one of the brackets 2. If the pivoted sleeve constitutes a bearing or guide for the supporting shaft 39 alone, it may be of the simple form indicated at 40, Fig. 1, but where additional parts are to be movably mounted therein it may be of the form indicated at 41, Figs. 1, 2, 4, 5 and 16. This manner of mounting the bobbin carrier shafts 39 enables them to move vertically and also to have movements toward and from the spinning frame 1. Vertical movements of the several shafts 39 are induced by the cooperation of the cams 37 and corresponding cam rollers 42 which are respectively journaled at approximate midlength of the pivoted levers 43 the outer ends of which respectively engage cam rollers 44 with which the supporting shafts 39 of the bobbin carriers are equipped. Lateral, i. e., forward and rearward swinging movements of the bobbin carrier supporting shafts 39 are induced by the engagement of the cams 38 with cooperating lugs or rollers 45 carried by counterweight arms 46 that are rigidly secured to the pivotal sleeves through which the shafts 39 are slidable.

Rotatably mounted upon the upper ends of the supporting columns or shafts 39 is the bobbin carrier by which full bobbins are taken from the spindles of the spinning frame and replaced with empty bobbins. In the present instance I have shown (see Fig. 1) a series of bobbin engaging members 47 rigidly attached to a bar 48 of T cross section (Figs. 2, 3, 4, 5 and 6) which is preferably rotatable in split ring bearings 49 (see Figs. 4 and 5) affixed to the upper ends of the movable supporting shafts or columns 39. Secured to one end of the T-bar 48 is a bevel pinion 50 which upon being caused to rotate induces a corresponding turning movement of the T-bar 48 and the bobbin engaging members 47 mounted thereon.

Each of the bobbin engaging members 47 is preferably provided at its opposite ends with slightly yielding bobbin clamps 51 and 52, respectively, (see more particularly Figs. 12 and 13, Sheet 6) the clamp 51 which is utilized for doffing the bobbin, being provided with spaced inclines 53 adapted to straddle the spindle 54 of the spinning frame and to force the full bobbin off its seat on said spindle, as will readily be understood upon reference to Fig. 15. The bobbin clamp 52 for the donning of an empty bobbin is formed with corrugations 55 in order to prevent accidental disengagement of the bobbin from the clamp as well as to facilitate forcing the empty bobbin to its seat upon the spindle of the spinning frame. The clamp 51 is likewise preferably provided with corrugations 55 to prevent accidental slipping of a full bobbin. Both of the bobbin clamps engage the bobbins at their lower ends or bases.

Rotary movement of the T section bar or shaft 48 to which the bobbin engaging members 47 are secured is preferably effected by the following mechanism: The bracket 41 is provided with a stub shaft 56 (see Fig. 16, Sheet 6), on which is revolubly mounted a bevel gear 57, Figs 1, 2 and 16; which meshes with a bevel pinion 58 that is secured to a shouldered sleeve 59 journaled in the said bracket and suspended therefrom in operative relation thereto by a collar 60 which is fastened to said sleeve by a key or pin 61. Extending through the sleeve 59 and splined to the latter by a feather 62 is a shaft 63 which extends parallel to the adjacent bobbin carrier supporting shaft 39. The shaft 63, which rotates with the sleeve 59 to which the bevel pinion 58 is secured, is connected at its upper end to the adjacent bobbin carrier supporting shaft 39 by a yoke or cross tie 64, Figs. 1, 2, 4 and 5, in such manner that said shaft 63 while being allowed to rotate is compelled to slide and swing in unison with the supporting shafts 39. A bevel pinion 65, Figs. 1 and 2, secured to the upper end of the shaft 63 meshes with the bevel pinion 50 on the end of the T-bar 48, thus providing means for rotating said bar and the bobbin engaging members associated therewith. Intermittent rotation of the bevel gears 57, 58, 65 and 50 and T-bar 48, is attained by the mutilated gear 66, Figs 1, 2, 4 and 5 fixed on the shaft 36 in conjunction with the interrupted gear 67, Figs. 1, 4 and 5, which is journaled on the stub shaft 56 and is rigidly pinned to the bevel pinion 57.

The shaft 6 by which the movements of the bobbin carrier are induced may be caused to revolve by means of the following simple clutch mechanism: A movable clutch member 68 (see Fig. 1) which is splined on the shaft 6 is adapted, by means of the spring 69, to be forced into engagement with the coacting clutch member 70 carried by the worm wheel 5. When the clutch members 68 and 70 are in operative engagement the motor 3 causes the shaft 6 to revolve, thus actuating the mechanism controlling the bobbin carrier. The clutch member 68 is normally held in inoperative position by the engagement of the incline 71 on the pedal lever 72 with a stop lug 73 projecting from the periphery of the clutch member 68. To cause the shaft 6 and the mechanism controlled thereby to be actuated it is only necessary to press upon the pedal 74 of the clutch lever 72 so as to withdraw the incline 71 and adjoining rest or stop for the stop-lug 73 from the path of the stop lug 73. When this is done the spring 69 will force the movable clutch member 68 into engagement with the coacting clutch member 70 carried by the worm wheel 5. Upon releasing the pressure on the pedal 74 the incline 71 engages the periphery of the clutch member 68 and is thus in position to cooperate with the stop lug 73 to disengage the movable clutch member 68 from the mating clutch member 70 after a single revolution of the worm wheel 5, and shaft 6, the engagement of the adjoining rest or stop on clutch lever 72 with the stop-lug 73 serving to arrest the shaft 6 at the termination of such revolution.

The operation of the beforedescribed mechanism is as follows: The clutch lever 72 is depressed so as to permit inter-engagement of the clutch members, causing the rotation of the motor shaft 4 to be communicated to the shaft 6. The clutch lever 72 is then allowed to reassume its normal position enabling its incline 71 and adjoining rest or stop to engage the stop lug 73 and arrest the motion of the shaft 6 after it has performed a single rotation. During the revolution of the shaft 6 and the corresponding rotation of the shaft 36 the respective cams 37 and 38 operate as follows: Referring to Fig. 2 and to the diagram, Fig. 11, an initial forward lateral swinging of the bobbin carrier supporting shafts 39 is caused by the action of the face 1ª of each cam 38 on the corresponding cam lug or roller 45. To compensate for the rise of the lower ends of the said shafts 39 due to their pivotal movement and to maintain the upper ends thereof in proper position, a slight ascending vertical movement indicated in dotted lines at 75 in Fig. 2, of the levers 43 that engage the rollers 44 at the lower end or the supporting shafts 39 is induced by the operation of the cam 37 acting on the cams rollers 42 carried by the levers 43. This forward swinging motion, which causes the donning elements 52 of the bobbin engaging members 47 to assume the position for taking empty bobbins 16 from cups 15 of the traveling chain belt 14, is indicated in the diagram Fig. 11 by the arc 1. At or about the termination of this forward swinging movement of the carrier supporting shaft 39, the cam face 1ᶜ on the cam 38 imparts a jerking motion to the said supporting shaft so as to loosen the bobbin from the bobbin receptacle 15 of the traveling belt 14.

The second movement of the bobbin carrier shafts 39 is an upward vertical one, as indicated at 2 in the diagrammatic figure, such movement causing the bobbin engaging members 47 to withdraw the empty bobbin from the cups 15. This movement of the shafts 39 is effected by the faces 2ᵃ of the cams 37. The succeeding rearward and forward lateral movements of the supporting shafts 39 and the bobbin carrier mounted thereon are indicated by the arcs 3, 5, 6, 8 and 10 in Fig. 11, and are respectively caused by the faces of the cam 38 marked 3ᵃ, 5ᵃ, 6ᵃ, 8ᵇ and 10ᵃ, while the succeeding vertical movements of the said shafts and bobbin carrier are indicated in the diagram by the arrows 4, 7 and 9, such vertical movements being respectively caused by the cam faces 4ᵃ, 7ᵃ, 8ᵃ and 9ᵃ of the cam 37.

The movement of rotation of the bobbin engaging members 47 from their initial position parallel to the supporting shafts 39, as shown in full lines in Fig. 2 of the drawings, to the position illustrated in dotted lines in said view, is caused by the action of the mutilated gear 66 driving the interrupted gear 67, the latter gear thereby inducing rotation to a corresponding extent of the bevel pinions 57 and 58, the shaft 63, the bevel pinion 65 at the upper end of the latter, and the mating bevel pinion 50 secured to the end of the T section bar 48 upon which the bobbin engaging members 47 are mounted. This first movement of rotation of the bobbin engaging members 47, namely to the dotted line position shown in Fig. 2 occurs during the forward lateral movement of the carrier shafts 39 indicated by the arrow marked 1 in the diagrammatic view, Fig. 11, and equals ninety degrees. A second movement of rotation of the bobbin engaging members 47, illustrated in Fig. 5, similarly caused by the cooperatiton of the mutilated gears 66 and 67, occurs during the forward and rearward lateral movements of the bobbin carrier supporting shafts 39 indicated by the arrows marked 5 and 6 on the diagram, such movement taking place during the time the cam faces 5ᵃ and 6ᵃ of the cam 38 are in operation and being through an angle of one hundred and eighty degrees. The final rotation of the bobbin engaging members 47, restoring them to the full line position of Fig. 2 occurs during the rearward lateral movement of the bobbin carrier indicated by the arrow marked 10 in the diagram. This last rotation is through an angle of ninety degrees.

When the bobbin engaging members 47 bearing the doffed filled bobbins have assumed the position illustrated in Fig. 7, which has occurred at the end of the forward lateral swinging movement indicated by the arrow 8 in the diagrammatic view, Fig. 11, the filled bobbins are in position to be deposited into the corresponding bell mouthed cups of the link belt 14, which latter is then at rest. The subsequent downward sliding movement of the bobbin carrier supporting shafts 39, as indicated by the arrow 9 in the diagram, results in delivering the filled bobbins into said cups, where they are left when the supporting shafts 39 execute the succeeding swinging movement rearward toward the spinning frame in reassuming the normal position of the parts.

When the filled bobbins have been delivered into the cups 15 the clutch lever 28 is manually manipulated to cause the chain belt 14 to be driven for an interval sufficient to cause the filled bobbins to be delivered from the cups 15 into the receptacle 18 and to allow the cups to withdraw from the chute 17 a sufficient number of empty bobbins to supply the bobbin engaging members 47 for the next succeeding doffing and donning operations.

It is apparent that many changes in details of construction may be made in the mechanism without departing from the spirit of my invention.

I claim:—

1. A bobbin carrier for doffing mechanism, said carrier provided with spaced bobbin clamps, each having an incline for loosening a bobbin upon a spindle.

2. A bobbin carrier for doffing mechanism, provided with a bobbin clamp having an incline for loosening a bobbin from its seat upon a spindle.

3. A bobbin carrier for doffing mechanism, provided with a bobbin clamp having corrugations for yieldingly holding a bobbin and having inclines for loosening a bobbin from its seat upon a spindle.

4. A bobbin carrier for doffing and donning mechanism, provided with pairs of spaced corrugated bobbin clamps, one of the bobbin clamps of each pair having an incline for loosening a bobbin from its seat upon a spindle.

5. A bobbin conveying mechanism, involving a movable member provided with bell mouth receptacles for the bobbins.

6. A bobbin conveying mechanism, involving a traveling member provided with laterally inclined bell mouth receptacles for the bobbins.

7. A bobbin conveying mechanism for doffing, involving a traveling member provided with bell mouth vertically slotted bobbin receptacles.

8. A bobbin conveying mechanism involving a traveling member provided with bell mouth vertically slotted bobbin receptacles, said receptacles being inclined transversely to the direction of travel of the traveling member.

9. In a doffing and donning mechanism, the combination with a bobbin doffing and donning carrier provided with spaced bobbin clamps, of a series of bobbin holders, and means for imparting lateral, vertical and rotary motion to the said carrier to transfer by the said bobbin clamps empty bobbins from the bobbin holders to a series of spindles and full bobbins from such spindles to the said holders.

10. In a doffing and donning mechanism, the combination with a bobbin doffing and donning carrier provided with spaced bobbin clamps, of a series of inclined bell mouth bobbin receptacles, and means for imparting successive lateral, vertical and rotary movements to the said carrier to cause the said clamp to withdraw empty bobbins from the receptacles and doff full bobbins from a series of spindles and deliver the doffed bobbins to said receptacles.

11. In a doffing and donning mechanism, the combination with a bobbin carrier having spaced bobbin clamps, of a traveling member provided with a bell mouth bobbin receptacle, said receptacle having a vertical slot in its leading side and being inclined transversely to the line of movement of said traveling member, and means for imparting to the bobbin carrier successive lateral, rotary and vertical movements.

12. In a doffing and donning mechanism, the combination with a bobbin carrier provided with spaced bobbin clamps, of a bobbin carrier supporting shaft, cams for imparting successive lateral and vertical movements to said carrier shaft, and interrupted gearing for imparting intermittent rotary movements to said bobbin carrier.

13. The combination with a spinning frame, of a movable belt member ranging lengthwise of a series of spindles in said spinning frame and provided with bobbin holding devices spaced correspondingly with the said spindles, and means carried by said frame for supporting a portion of said belt member.

14. The combination with a spinning frame, of a plurality of bobbin holding devices spaced correspondingly with the spindles of said spinning frame, clutch means for connecting said devices to a source of power to produce movement of said devices lengthwise of the series of spindles, and automatic means for limiting the movement of said movable member.

15. The combination with a spinning frame, of a traveling member provided with a plurality of bobbin holding devices, clutch mechanism for connecting and disconnecting said traveling member to and from a source of power, and automatic means for disengaging said clutch mechanism after a predetermined movement of said traveling member.

16. The combination with a bobbin carrier provided with spaced bobbin clamps, of a bobbin carrier supporting shaft, means for imparting successive lateral and vertical movements to said carrier shaft, clutch means for connecting said first named means to a source of power, and automatic means for disconnecting said clutch means after the said shaft has gone through its cycle of movements.

17. The combination with a bobbin carrier provided with spaced bobbin clamps, of a rotary shaft, and means actuated thereby adapted to impart lateral and vertical movements to said bobbin carrier, clutch mechanism for connecting said shaft to a source of power, and automatic means for disconnecting said clutch mechanism after a predetermined rotation of said shaft.

18. Doffing and donning mechanism having combined with the doffing and donning devices thereof a conveyor which maintains empty bobbins at spaced distances apart, conveys them into position to be taken by the donning devices, receives the doffed bobbins from the doffing devices, and conveys them away.

19. The combination of a bobbin-supplying station, and a conveyor which receives empty bobbins at such station, conveys them into position to be taken by the donning devices, receives the doffed full bobbins from the doffing devices, and conveys them away, with donning devices which take the empty bobbins from said conveyor, and doffing devices which deliver the doffed bobbins to the conveyor.

20. In combination, a series of bobbin receptacles, series donning devices which take empty bobbins from said receptacles, and series doffing devices which deposit doffed full bobbins in the said receptacles.

21. Doffing and donning mechanism comprising holders for a series of empty bobbins, and doffing and donning devices which collectively doff the full bobbins from a series of spindles, transfer the said empty bobbins from the said holders to the said spindles, and deliver the doffed full bobbins to the holders from which the empty bobbins were taken.

22. The combination with an empty bobbin supply-station, of a conveyor movable lengthwise of the series of spindles of a spinning frame and having holders which receive bobbins at such station, and means for actuating said conveyor to carry the bobbins which are held by said holders to positions corresponding with the positions of the respective spindles of the series.

23. The combination of a bobbin-supplying station, and a movable series of bell-mouthed bobbin receptacles which travel past said station and receive bobbins thereat, each receptacle having in its wall a slot through which a bobbin enters the receptacle, with donning devices which take the bobbins from said receptacles and place them upon the spindles of a spinning frame.

24. The combination with doffing and donning devices cooperating with a series of spindles in a spinning frame, of a bobbin-supply station, and an endless traveling conveyor-system receiving empty bobbins from said station, keeping them at spaced distances apart, surrendering them to the donning devices and receiving full bobbins from the doffing devices, and discharging the full bobbins at a discharging point.

25. A traveling bobbin-carrier, ranging lengthwise of a series of spindles in a spinning frame, by which empty bobbins are carried at spaced distances apart to positions corresponding respectively with those of the respective spindles upon which they are to be placed.

26. Bobbin-supplying devices for spinning frames comprising a movable endless conveyor provided with a series of bobbin-holders spaced correspondingly with the spindles of a spinning frame, means for feeding said conveyor lengthwise of the series of spindles, and means for automatically limiting the feed-movement.

27. Bobbin-supplying devices for spinning frames comprising a traveling conveyor provided with a series of bobbin-holders, actuating means for causing said conveyor to travel lengthwise of a series of spindles in a spinning frame, and means moving with the conveyor for throwing the said actuating means out of gear at a predetermined point in the travel of the conveyor.

28. Bobbin-supplying devices for spinning frames comprising a bobbin-supply station, a traveling conveyor provided with a series of bobbin-holders receiving bobbins from said station, actuating means for causing the conveyor to travel lengthwise of a series of spindles in a spinning frame, and means acting to throw said actuating means out of gear when the conveyor has moved a predetermined distance to present said bobbins in positions adjacent the respective spindles of such series.

29. The combination of a bobbin-supplying station, and a movable conveyor which receives empty bobbins at such station and transports them at spaced distances apart to positions for transfer to the the spindles of a spinning frame, with donning devices for transferring such bobbins to the said spindles.

30. In combination, a movable conveyor transporting a series of empty bobbins regularly spaced apart and by which they are presented at points corresponding with the spindles of a spinning frame, and donning devices by which such bobbins are applied to the said spindles.

31. In combination, a conveyor supplied at one end of a series of spinning spindles with empty bobbins and presenting the latter in positions corresponding with those of the respective spindles of the said series, and means for collectively transferring the said bobbins from the conveyor to the spindles.

32. In combination, means for supporting a series of bobbins with their tips turned downward in positions adjacent a series of spindles in a spinning frame, and donning devices which take the bobbins from said supporting means, invert them, and place them tips uppermost upon the said spindles.

33. In combination, means for supporting a series of bobbins with their tips turned downward in positions adjacent a series of spindles in a spinning frame, a rotative carrier provided with a series of donning members, and means for actuating said carrier and donning members to cause the latter to take the series of bobbins collectively from the supporting means, invert them, and place them in normal working position upon the spindles.

34. Bobbin-handling mechanism comprising a rotatable carrier provided with spaced bobbin engaging members, carrier-supporting means, a shaft, means actuated by said shaft for imparting vertical, forward, and rearward movements to said supporting means and carrier, and means intermediate the carrier and shaft acting to intermittingly rotate the carrier.

35. Bobbin-handling mechanism comprising a rotatable carrier provided with spaced bobbin engaging members, carrier-supporting means, two shafts, means actuated by one thereof for occasioning vertical movements of said carrier, means through which the other shaft occasions movements of the carrier toward and from the spindles of a spinning frame or the like, means through which one of said shafts intermittingly rotates the carrier, and driving connections between the two shafts.

36. In combination, a series of bobbin holders, donning devices which take empty bobbins from said holders and place them upon the spindles of a spinning frame, and doffing devices which doff full bobbins from the said spindles and surrender them to the said holders.

37. Doffing and donning mechanism comprising holders for a series of empty bobbins and doffing and donning devices by which empty bobbins are taken from the said holders and placed upon the spindles of a spinning frame, and full bobbins are removed from said spindles and surrendered to the said holders.

38. The combination with an empty bobbin supply-chute, of a conveyor movable lengthwise of the series of spindles of a spinning frame and having pockets which receive empty bobbins from said supply-chute, and means for actuating said conveyor to carry the bobbins which are contained in such pockets to positions corresponding with the positions of the respective spindles of the series.

In testimony whereof I affix my signature.

WILLIAM W. MILLER.

Certificate of Correction.

It is hereby certified that in Letters Patent No. 1,463,479, granted July 31, 1923, upon the application of William W. Miller, of Martinsville, Virginia, for an improvement in " Doffing and Donning Mechanism," an error appears in the printed specification requiring correction as follows: Page 5, lines 126 and 127, claim 7, strike out the words " for doffing "; and that the said Letters Patent should be read with this correction therein that the same may conform to the record of the case in the Patent Office.

Signed and sealed this 11th day of September, A. D., 1923.

[SEAL.]

KARL FENNING,
*Acting Commissioner of Patents.*